UNITED STATES PATENT OFFICE.

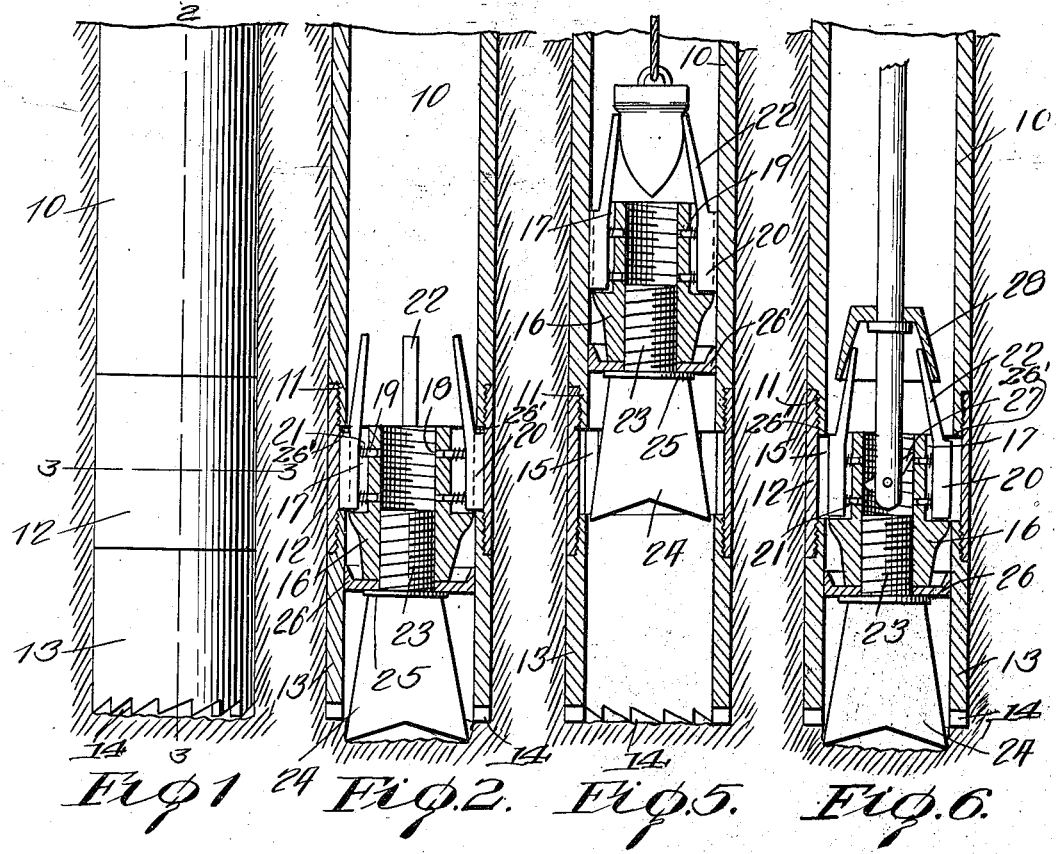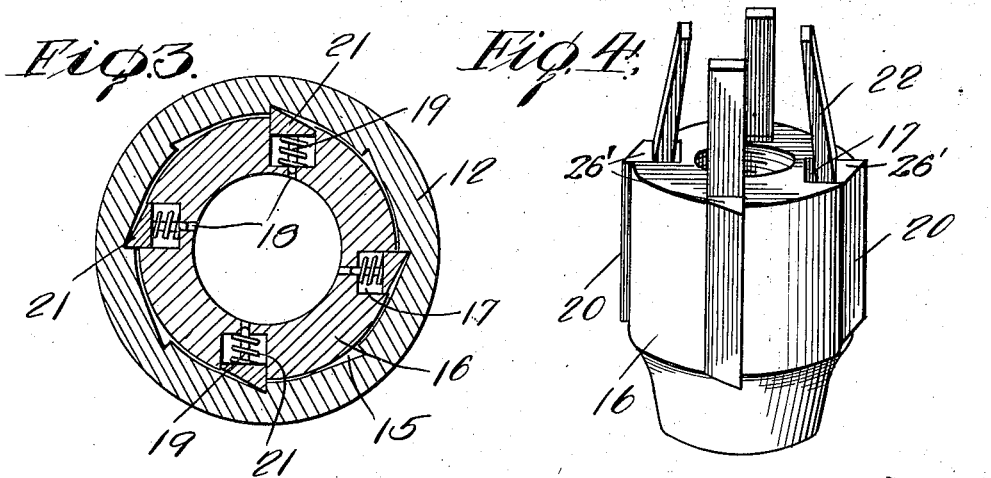

JOHN W. ROBY, OF HAMMON, OKLAHOMA.

DRILL-BIT CLUTCH.

1,142,460.

Specification of Letters Patent.   Patented June 8, 1915.

Application filed April 22, 1914.   Serial No. 833,760.

*To all whom it may concern:*

Be it known that I, JOHN W. ROBY, a citizen of the United States, residing at Hammon, in the county of Roger Mills, State of Oklahoma, have invented certain new and useful Improvements in Drill-Bit Clutches; and I do hereby declare the following to be a full, clear, and exact description of the invention, such as will enable others skilled in the art to which it appertains to make and use the same.

This invention relates to the art of drilling wells and has special reference to a drill bit clutch designed to act in conjunction with the casing in drilling a bored well.

The principal object of the invention is to provide an improved form of bit clutch which may be used in connection with the casing of a well to drill the well through a rotary boring operation, said clutch being arranged to be inserted or removed from the lower end of the casing by suitable tools and yet to be connected to said casing so as to rotate therewith during the boring operation.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—Figure 1 is a vertical section through a bored well showing the tool in position in the bottom thereof. Fig. 2 is a section on the line 2—2 of Fig. 1. Fig. 3 is a section on the line 3—3 of Fig. 1. Fig. 4 is a perspective view of the clutch removed from the well. Fig. 5 is a section through the well casing showing the clutch and bit being lowered through said casing. Fig. 6 is a view similar to Fig. 5 but showing the tool used for the removal of the clutch.

In the drawings accompanying this invention there is disclosed the ordinary tubular well casing 10 but the lower end of this well casing is threaded exteriorly as at 11 and on this threaded lower end is screwed a coupling 12. To this coupling is attached a boring member 13 having serrations 14 on its lower end, it being understood that the member 12 is of sufficient length so that the lower end of the casing 10 is spaced from the upper end of the member 13. This coupling 12 is provided on its interior, between the threaded portions thereof, with grooves 15.

The bit clutch proper consists of a circular member 16 provided with grooves 17 on its outer surface corresponding to the number of grooves 15 in the member 12. Leading inward from these grooves 15 are pin receiving openings 18 wherein fit pins 19 carried by pawl members 20. Between the inner sides of the pawl members 20 and the bottoms of the grooves 17 are located spiral springs 21 which normally urge said pawl members outward. The upper ends of these pawl members are provided with resilient extensions 22 for purposes hereinafter to be described.

The member 16 is hollow and is threaded at its lower end for the reception of the shank 23 of a drill bit 24, the drill bit being provided with the usual washer 25 and packing basket 26. The member 16 is of such size as to fit snugly in the casing 10 so that when this member passes down into the casing and arrives at the member 12 the springs are enabled to force the pawls 20 outward thus engaging them in the grooves 15 so that when the casing is rotated the drill bit may be rotated therewith. In order to lower this member and also to assist in forcing the pawls outward the spring fingers 22 are separated slightly, after the member has been inserted in the casing, and a suitable pipe section is inserted between the spring fingers so as to enable them to grip said member. The lowering rope is then attached to this member and the clutch allowed to pass down the casing until the member 12 is reached. When this is reached the pawls spring outward. Then, upon drawing upward on the lowering cable, the shoulders 26′, formed between the bodies of the pawls and the resilient extensions thereon, serve to prevent the member 16 being again drawn up, as they engage the bottom of the casing 10. However, if, upon completion of the well, it is desired to withdraw the bit 24 it is merely necessary to lower down into the well an ordinary tool employed for extracting pipe sections from the well, this tool being known technically as a "bulldog" and being of the shape shown at 27, but being furthermore provided with a ring 28 which slips over the extensions 22 and compresses the extensions so that the shoulders 26′ no longer engage against the bottom of the pipe 10 while the bulldog itself engages inside of the member 16 thus enabling the cable, when drawn upward, to engage the member 16 and thereby remove the bit from the well.

There has thus been provided a simple and efficient device of the kind described and of the character specified.

It will be obvious that many minor changes may be made in the form and construction of this device without departing from the material principles thereof. It is not therefore desired to confine the invention to the exact form herein shown and described, but it is wished to include all such as come properly within the scope claimed.

Having thus described the invention, what is claimed as new, is:—

1. In a device of the kind described, the combination with a well casing, of a coupling on the lower end of said well casing, an extension screwed into said coupling, said coupling being provided with longitudinally extending grooves; and a bit carrying member slidable through said casing and provided with pawls adapted to engage the grooves in said coupling.

2. In a device of the kind described, the combination with a coupling member provided with longitudinally extending grooves, of a bit carrying member provided with longitudinally extending grooves corresponding in number to the grooves of said coupling, strips mounted for radial movement in said grooves, springs normally urging said strips outward, and resilient extensions on the upper ends of said strips, said extensions being inclined inwardly.

3. In a device of the kind described, a coupling member provided with longitudinally extending grooves intermediate the ends, a bit carrying member provided with longitudinally extending grooves having radial pin receiving openings extending inwardly therefrom, strips constituting pawls and provided with pins entering said openings, said pawls being received in said grooves, springs surrounding said pins and normally urging said pawls outwardly, and inwardly inclined spring extensions at the upper ends of said strip, said extensions extending above the upper end of said bit carrying member.

In testimony whereof, I affix my signature, in the presence of two witnesses.

JOHN W. ROBY.

Witnesses:
H. M. PARKS,
J. KARNS.